United States Patent [19]
Frank

[11] 3,904,652
[45] Sept. 9, 1975

[54] RECYCLE PROCESS FOR OXIDATION OF N-BUTANE TO MALEIC ANHYDRIDE
[75] Inventor: Marshall E. Frank, Ossining, N.Y.
[73] Assignee: Standard Oil Company (Indiana), Chicago, Ill.
[22] Filed: Nov. 16, 1972
[21] Appl. No.: 307,038

[52] U.S. Cl. .............................................. 260/346.8
[51] Int. Cl.² ........................................ C07D 307/60
[58] Field of Search .............................. 260/346.8 A

[56] References Cited
UNITED STATES PATENTS
3,293,268   12/1966   Bergman .......................... 260/346.8
FOREIGN PATENTS OR APPLICATIONS
1,069,150   11/1959   Germany ......................... 260/346.8
1,258,987   3/1961    France ............................. 260/346.8
2,072,336   9/1971    France OTHER PUBLICATIONS
Bissot, et al., Industrial and Engineering Chemistry Product Research and Development March 1963, Vol. 2, No. 1, pp. 57–60.

Primary Examiner—Henry R. Jiles
Assistant Examiner—Bernard I. Dentz
Attorney, Agent, or Firm—Gunar J. Blumberg; Arthur G. Gilkes; William T. McClain

[57] ABSTRACT
In the oxidation of butane to form maleic anhydride over a phosphorus-vanadium-oxygen complex catalyst, improved yields and processing advantages are obtained by using low oxygen concentrations and recycling the off-gas from the scrubbing operation.

9 Claims, 1 Drawing Figure

PATENTED SEP 9 1975
3,904,652
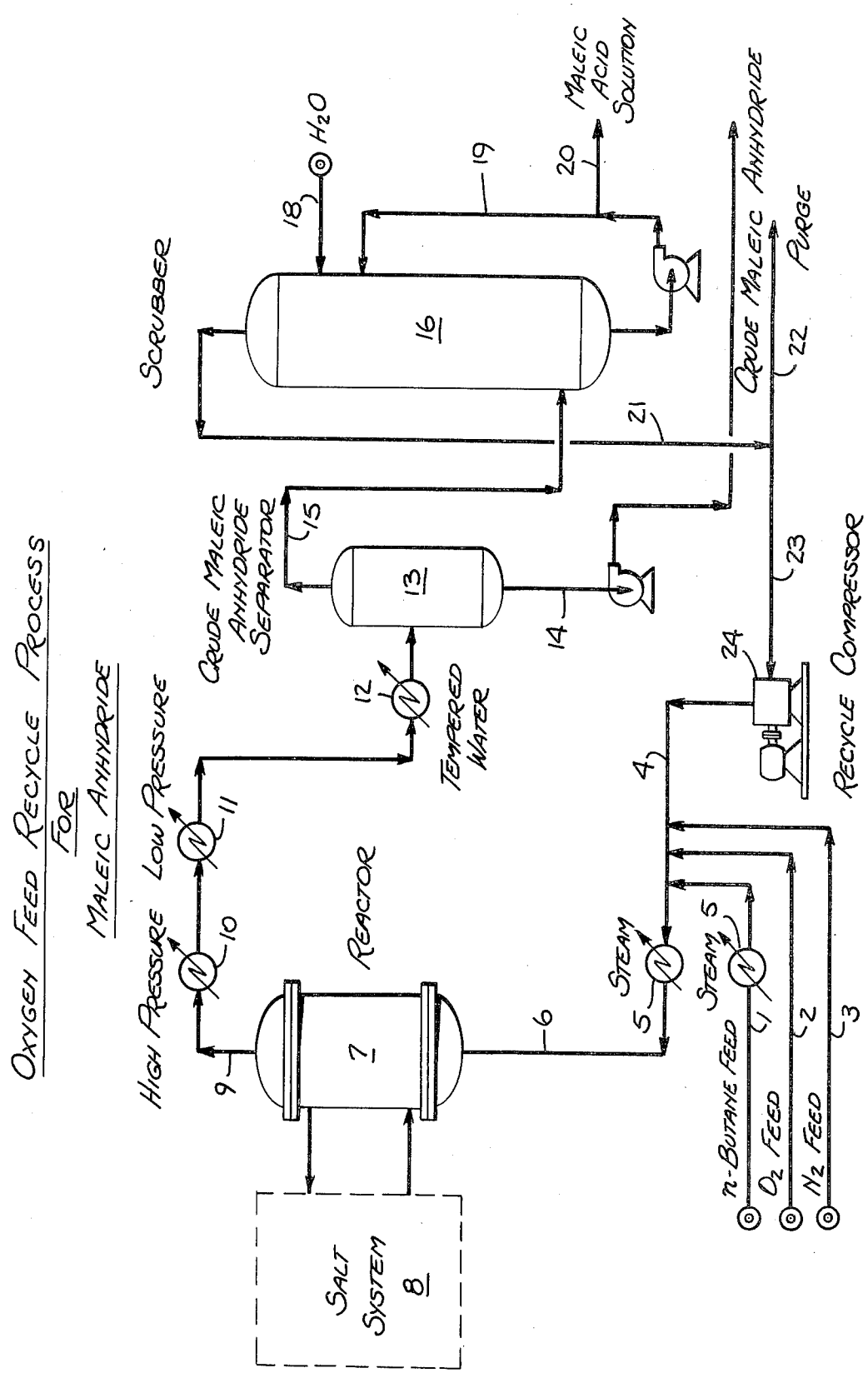

RECYCLE PROCESS FOR OXIDATION OF N-BUTANE TO MALEIC ANHYDRIDE

DESCRIPTION OF THE INVENTION

This invention relates to an improved process for producing maleic anhydride from n-butane using a phosphorus-vanadium-oxygen complex catalyst. More specifically, the invention teaches the use of low oxygen concentrations during the oxidation and the recycling of off-gas from the reactor effluent scrubber.

Butane oxidation to make maleic anhydride over a phosphorus-vanadium-oxygen complex catalyst is known and has been described in the literature (see U.S. Pat. No. 3,293,268). Because of its ready availability, it has always been preferred to feed air to the process as the oxidizing agent. For example, in the aforesaid patent, air is used in each and every example.

Unfortunately, where air is feed to the reactor, many process difficulties are encountered. Most importantly, because of the explosivity of butane-air mixtures, the amount of butane fed must be sharply limited. For example, at 25° C., the flammable limit for butane is 1.8%, at 400° C. the flammable limit is 1.4%. To provide a sufficient margin of safety, the process must, therefore, be designed for a maximum of 1.4 to 1.6% butane. Such low concentrations naturally adversely affect the reaction rate and, to obtain optimum productivity, dictate longer reaction times, higher catalyst loading and higher temperatures, all conditions which have their negative effects.

In the conventional air oxidation, high conversions are mandatory because the unconverted butane leaving the reaction is lost. The dilemma can be solved only by recovering and recycling the unreacted butane, but again where air is used, the butane concentration in the off-gas is so low, diluted mainly by the large quantity of nitrogen, that the cost of recovery is prohibitive. Direct recycle of the off-gas is not possible because the nitrogen build-up cannot be tolerated.

In accordance with the instant invention it has now been discovered that much higher ultimate conversions of n-butane to maleic anhydride can be achieved by feeding enriched oxygen to the process, maintaining a concentration of oxygen in the reaction zone below the flammable limit, and recycling the gaseous effluent stream containing the unreacted n-butane to the reactor after the separation of the maleic anhydride. The ultimate conversion increases, because higher butane concentrations can be reacted, thereby increasing the catalyst productivity. Capital and operating costs of the system are reduced, because of decreased gas flow through the reaction and recovery system. Furthermore, the energy need for compression is minimized.

An unexpected advantage of operating in this mode is that higher selectivities to maleic anhydride are obtained. This has the added benefit of reducing the heat generated per pound of butane converted, since the heat of reaction to undesirable by-products, CO and $CO_2$, are higher than to maleic anhydride.

In order to illustrate the invention more fully, a process flow diagram of a preferred embodiment of the invention is shown in the attached FIGURE.

215 moles per hour of normal butane, 912.51 moles per hour of oxygen and 789.79 moles per hour of nitrogen and argon are fed via lines 1, 2 and 3 to line 4, heated in heat exchangers 5, and passed to reactor 7 via line 6. Reactor 7 is composed of 15,000 tubes, 1 inch diameter × 16 feet long. The tubes are each packed with 3.6 pounds of a phosphorus-vanadium-oxygen complex catalyst activated with zinc. The atomic ratio of phosphorus/vanadium/zinc is 1.15/1.0/0.19. The composition of the gas feed entering the reactor via line 6 is shown in the following table:

Reactor Feed

|  | Moles/Hr. | Mol/% |
|---|---|---|
| $C_4H_{10}$ | 333.84 | 2.78 |
| $O_2$ | 1,335.38 | 11.12 |
| CO | 1,285.31 | 10.71 |
| $CO_2$ | 963.70 | 8.03 |
| $H_2O$ | 872.56 | 7.27 |
| MAN | — | — |
| $N_2$+A | 7,209.96 | 60.09 |
|  | 12,000.75 | 100.00 |

The normal butane is oxidized to maleic anhydride in reactor 7 at a temperature which varies from 420° to 490° C., a pressure from 10 to 20 psi above atmospheric, and for a contact time of 0.8 sec. The heat is controlled by means of heat exchange with the salt system 8.

The reactor effluent exits via line 9 and contains:

Reactor Effluent

|  | Moles/Hr. | Mol/% |
|---|---|---|
| $C_4H_{10}$ | 133.54 | 1.09 |
| $O_2$ | 475.17 | 3.89 |
| CO | 1,445.55 | 11.83 |
| $CO_2$ | 1,083.89 | 8.87 |
| $H_2O$ | 1,742.79 | 14.26 |
| MAN | 130.20 | 1.06 |
| $N_2$+A | 7,209.96 | 59.00 |
|  | 12,221.10 | 100.00 |

The effluent is cooled in heat exchangers 10, 11 and 12 and passed to the crude anhydride separator 13. The condensed cooled maleic anhydride (77.47 moles per hour) is withdrawn from the separator via line 14. The gaseous material, withdrawn via line 15, contains:

Scrubber Feed

|  | Moles/Hr. | Mol/% |
|---|---|---|
| $C_4H_{10}$ | 133.54 | 1.10 |
| $O_2$ | 475.17 | 3.91 |
| CO | 1,445.55 | 11.90 |
| $CO_2$ | 1,083.89 | 8.92 |
| $H_2O$ | 1,742.79 | 14.35 |
| MAN | 52.73 | .43 |
| $N_2$+A | 7,209.96 | 59.38 |
|  | 12,143.63 | 100.00 |

This material passes to scrubber 16 where the gas is scrubbed with water entering via line 18 and a recycle stream 19 of maleic acid solution. The effluent from the scrubber 16 is withdrawn via line 21 and divided into a purge stream 22 and a recycle stream 23. The purge stream has the following composition:

Purge

|  | Moles/Hrs. | Mol/% |
|---|---|---|
| $C_4H_{10}$ | 14.80 | 1.18 |
| $O_2$ | 52.30 | 4.17 |

-Continued

| | Purge | |
| --- | --- | --- |
| | Moles/Hrs. | Mol/% |
| CO | 160.20 | 12.76 |
| CO$_2$ | 120.18 | 9.57 |
| H$_2$O | 108.83 | 8.67 |
| MAN | — | 0.00 |
| N$_2$+A | 799.00 | 63.65 |
| | 1,255.31 | 100.00 |

The composition of the recycle stream is:

| | Recycle | |
| --- | --- | --- |
| | Moles/Hrs. | Mol/% |
| C$_4$H$_{10}$ | 118.74 | 1.18 |
| O$_2$ | 412.87 | 4.10 |
| CO | 1,285.31 | 12.78 |
| CO$_2$ | 963.71 | 9.57 |
| H$_2$O | 872.56 | 8.67 |
| MAN | — | 0.00 |
| N$_2$+A | 6,410.93 | 63.70 |
| | 10,064.12 | 100.00 |

After compression in recycle compressor 24, the recycle stream is passed to the reactor 7 as previously described.

By following the aforesaid process an ultimate conversion of 93.1% at a selectivity of 56.5 mol % to maleic anhydride may be obtained. As will be noted, the per pass conversion is only 60%. This low conversion permits obtaining high selectivity and the recycle scheme of the invention permits the recovery and reuse of the unreacted normal butane.

Most preferably oxygen from commercial air separation plants is used. This oxygen is at a minimum purity of 99.5%. However, lower purity oxygen, down to a minimum of about 50%, may also be advantageously used. Still lower percentages of oxygen are not desirable because excessive purging would be required which would result in the loss of additional unreacted n-butane.

Preferably, the oxygen is obtained, under pressure, from a pipeline and requires no compression for use in the process. This is a marked advantage over the use of air where separate compressor capacity is required. In the instant invention only the recycle stream need be compressed. Since this stream is of a lesser volume, the cost and operation of the compressor is minimized.

Since the off-gas from the scrubber contains, in addition to the n-butane, carbon monoxide and carbon dioxide formed in the reaction, it is necessary to purge a portion of this stream from the process. Since these components build up to an equilibrium level, it is only necessary to remove that amount formed in each pass through the reactor.

In order to maintain the oxygen concentration below the lower limit, an inert gas is added to the process. While nitrogen is preferred, other inert gases such as argon, helium or lower hydrocarbons such as methane and ethane may be used. It is most desirable to use an inert gas having a high specific heat since this increases the maximum concentration of oxygen which may safely be reacted.

In the case where nitrogen is used as the diluent, the oxygen concentration must be below 13%, the flammable limit for the butane-oxygen-nitrogen system. Pure nitrogen may be combined with pure oxygen and the recycle stream, as shown on the attached figure, or air may be feed to the recycle compressor 24 along with the scrubber off-gas. In this latter embodiment, less pure oxygen need be added to the system via line 2. This would offset the small additional amount of compression required. Other sources of oxygen and diluent may be selected as will be apparent to those skilled in the art.

The concentration of n-butane maintained in the reactor, by following the teaching of the invention, is not limited by the danger of explosion; therefore higher concentrations may be used, thereby increasing conversion without the drawbacks inherent in high temperatures, higher catalyst loading and longer contact times. The butane concentration is dependent on two factors: firstly, the amount of heat generated in the reaction; and, secondly, the amount of oxygen consumed per mole of butane reacted. Considering normal fixed bed operation, as will be readily understood by the skilled chemical engineer, no more than two moles of butane should be reacted for each 100 moles of reactor feed. Greater amounts result in the generation of heat which is not readily dissipated. From the stoichiometry of the reaction, for a typical case, assuming that 60% of the butane is converted to maleic anhydride, 25% to carbon monoxide and 15% to carbon dioxide, 4.25 moles of oxygen are consumed for each mole of butane reacted. For a 13% oxygen feed, no more than three moles of butane can be reacted before the oxygen is totally consumed. Naturally, it is desirable because of reaction rate considerations to operate at low to intermediate per pass conversions. In the process of the invention low conversions per pass are acceptable because the bulk of the unreacted butane is recycled, thereby attaining high ultimate conversions.

Based upon previous literature, the results realized could not be anticipated. For instance, Ioseffe, et al., (Kinetika i Kataliz, 3 (1962), pages 261–270) noted that when the oxygen concentration falls below 10 volume percent for the oxidation of benzene to maleic anhydride over a vanadium supported catalyst, the rate of reaction is lowered dramatically. It was concluded that reaction rate is proportional to the square of oxygen concentration. If this were true in the reaction configuration of the invention, no increased productivity would be realized and greatly increased contact times relative to the once-through air operation would be required. The results herein, in fact, indicate a reaction rate proportional to the first power of oxygen concentration. This explains the beneficial results realized at these low oxygen levels.

Another surprising result which benefits this mode of operation is that CO will not further oxidize to CO$_2$ when recycled over the catalyst. This is important in reducing the heat load of the system and in beneficially utilizing the feed oxygen.

It is of major importance in the practice of the invention to maintain the oxygen below the flammable limit of the system. In practice this limit depends on the temperature and the heat capacity of the gases in the reaction zone. For example, at a reaction temperature of 500° C. and using nitrogen as the diluent, the flammable limit is about 13%. For a particular system the flammable limits have to be determined experimentally. These limits are not only dependent on pressure, temperature and concentration, but also are affected by the configuration of the reaction vessel. A reasonable estimate can be made, however, since it is known that increasing temperatures and pressure tend to extend the range of compositions at which a mixture is in the flammable region.

The vapor phase oxidation of the n-butane is carried out at a temperature of from 300° to 650° C., but preferably from 400° to 550° C. Contact times over the catalyst are from 0.05 to 5 seconds, preferably from 0.1 to 1.5 seconds. Lower temperatures favor long catalyst life, but longer contact times are required.

The pressure in the reactor is not generally critical, and the reaction may be conducted at atmospheric, super-atmospheric or below atmospheric pressure. The exit pressure will be at least slightly higher than the ambient pressure to insure a positive flow from the reaction. The pressure of the inert gases must be sufficiently high to overcome the pressure drop through the reactor.

A variety of feedstocks containing butane may be fed to the reactor. Pure butane may be introduced with air. Butane-isobutane, butane-butene, butane-butadiene and combinations thereof may also be used. Preferably the feedstock should contain at least 50% butane.

U.S. Pat. No. 3,293,268, the disclosure of which is incorporated by reference herein, describes broadly the phosphorus-vanadium-oxygen complex catalyst and its method of preparation as well as the broad class of saturated aliphatic hydrocarbons which may be effectively oxidized with such catalyst. The application of these catalysts to the oxidation of unsaturated aliphatic hydrocarbons is described in U.S. Pat. No. 3,156,705.

It is a preferred embodiment of the instant invention to employ a phosphorus-vanadium-oxygen complex catalyst which contains a zinc activator. Such catalysts give extremely high yields of maleic anhydride at relatively mild reaction conditions.

It is preferred to prepare the catalyst by refluxing the vanadium, phosphorus, and activator metal components together. Other methods, of course, may also be used. It is, however, desirable to employ a technique which forms a highly crystalline, rather than a substantially amorphous catalyst.

In preparing the active catalyst, the atomic ratio of phosphorus to vanadium should be maintained from about 0.5 to 5, preferably one to two atoms of phosphorus per atom of vanadium. Most preferably, the ratio is from about 1.1 to 1.6 atoms of phosphorus per atom of vanadium. The catalyst activator should be present in a ratio from about 0.05 to about 0.35 atoms per atom of vanadium, and more preferably from about 0.1 to about 0.25 atoms per atom of vanadium. The activator may be composed of one or more metals and may be used with or without promoters. Preferably, the activator is zinc, bismuth, copper or lithium. It may be present in the elemental or salt form. In the case of zinc, the aforesaid ratio is equivalent to about 3.0 to 25 weight percent of zinc, preferably from about 5.0 to 10 weight percent, based on the total weight of vanadium, oxygen and phosphorus.

The catalysts are prepared by combining the vanadium with a phosphorus compound. When a vanadium oxysalt is combined with the phosphorus compound a vanadium-oxygen-phosphorus complex is formed. The vanadium oxysalt may be added as such or formed in situ during the preparation of the vanadium-oxygen-phosphorus complex. Thus, for example, the vanadium oxysalt may be preformed and the phosphorus compound then added or the vanadium oxide, phosphorus compound and salt forming acid mixed simultaneously with the oxysalt being formed in situ. The method whereby the oxysalt is preformed is the preferred method.

The catalyst activator may be introduced into the catalyst in a number of ways. The method of introduction may be any method which results in the added activator being intimately combined with the vanadium-oxygen-phosphorus complex. The activator may be added during the preparation of the vanadium-oxygen-phosphorus complex, or the complex may first be prepared and the activator added either before, at the same time, or after either the vanadium or phosphorus compound is added. The activator may be added before, after, or at the same time as the carrier, if any, is added.

As noted previously, catalyst complexes which are prepared by a solution or "reflux" method are preferred. For example, if vanadium oxychloride is used, the solvent may be concentrated hydrochloric acid. The vanadium oxychloride solution may be readily obtained by dissolving vanadium pentoxide in concentrated hydrochloric acid. The phosphorus may then be introduced by adding a phosphorus compound such as phosphoric acid, $P_2O_5$ or $POCl$ to the vanadium oxychloride to form the vanadium-oxygen-phosphorus complex dissolved in the hydrochloric acid. The added catalyst activator is normally dissolved along with the vanadium pentoxide in hydrochloric acid, or if, for example, vanadium oxychloride is the starting material, it may be dissolved in a solution thereof prior to the addition of the phosphorus compound. The rate of formation of the complex may be increased with the use of heat.

The vanadium oxysalt used in the preparation of the catalyst may desirably contain, as the salt forming anion, any anion of an acid which is more volatile than the anion of phosphoric acid and which is not normally an oxidizing agent for vanadium during the catalyst preparation. The acid precursor of the anion may be either organic or inorganic. Acids such as hydrochloric, hydroiodic, hydrobromic, acetic, oxalic, malic, citric, formic and mixtures thereof, such as a mixture of hydrochloric and oxalic, may be used. Less desirably, sulfuric and hydrofluoric may be employed. Other reducing agents which may be employed, but which have not given catalysts that are as desirable, are organic aldehydes such as formaldehyde and acetaldehyde; alcohols such as pentaerythritol, diacetone alcohol and diethanolamine, and additional reducing agents, such as hydroxyl amines, hydrazine, sulphur dioxide and nitric oxide. Nitric acid and similar oxidizing acids, which would oxidize the vanadium from a valence of 4 to 5 during the preparation of the catalyst, should be avoided. Vanadium oxysalts formed from the inorganic acids have given excellent results. The best results are obtained using the salt from hydrochloric acid; that is, using vanadium oxychloride.

Although the catalysts may be separately formed and used as pellets, it is more economical and practical to to deposit this material on a carrier. Before the carrier is combined with the catalyst, the solution of catalyst is preferably concentrated to a solution which contains from about 30 to 80% volatiles. Even better results are obtained when there is from about 50 to 70% volatiles by weight. The carrier may be added to the catalyst solution or the catalyst solution may be poured onto the carrier. Less desirably, the carrier may be present during the whole course of reactions to provide the desired vanadium-oxygen-phosphorus complex.

The support or carrier for the vanadium-oxygen-phosphorus complex, if any, should preferably be inert to the deposition solution containing the complex and should be inert under the catalytic oxidation conditions. The support provides not only the required surface for the catalyst, but gives physical strength and stability to the catalyst material. The carrier or support The following example further illustrates the practice of the invention:

EXAMPLE

In a reactor having a volume of 3.96 cc. and containing 3.87 grams of a zinc activated phosphorus-vanadium-oxygen complex catalyst (P/V/Zn = 1.15/1.0/0.19), n-butane is oxidized at the temperatures, flow rate and feed ratios shown below. The first five runs show the use of an air feed, while the last five show the use of the low oxygen feed of the invention:

Table

| Hours on Stream | Temp °C. | Flow cc/min | Feed mole % | | Per Pass Butane Conv. | Moles Butane Converted per 100 moles of Feed | % Selectivity to Maleic Anhydride | No. MAN No. Butane Converted |
|---|---|---|---|---|---|---|---|---|
| | | | $O_2$ | Butane | | | | |
| 340 | 460 | 81.2 | 21.4 | 1.33 | 90.7 | 1.20 | 52.7 | .807 |
| 404 | 450 | 81.2 | 21.4 | 1.33 | 85.9 | 1.14 | 56.1 | .814 |
| 408 | 450 | 81.2 | 21.4 | 1.33 | 85.7 | 1.14 | 56.7 | .821 |
| 428 | 450 | 81.2 | 21.4 | 1.33 | 84.7 | 1.13 | 55.1 | .788 |
| 429 | 452 | 81.2 | 21.4 | 1.33 | 85.7 | 1.14 | 55.7 | .807 |
| 430 | | | Changed to Low $O_2$ Feed Mixture | | | | | |
| 433.5 | 430 | 81.2 | 9.29 | 3.40 | 38.9 | 1.32 | 63.4 | 1.07 |
| 435 | 430 | 81.2 | 9.30 | 3.37 | 37.3 | 1.26 | 60.8 | 1.03 |
| 454 | 430 | 81.2 | 11.0 | 3.34 | 39.2 | 1.31 | 61.5 | 1.04 |
| 457 | 430 | 81.2 | 11.0 | 3.38 | 40.3 | 1.36 | 63.2 | 1.07 |
| 459 | 430 | 81.2 | 11.0 | 3.34 | 39.9 | 1.33 | 62.9 | 1.06 | generally has a low surface area, i.e., from about 0.001 to about 5 square meters per gram. A desirable form of carrier is one which has a dense non-absorbing center and a rough surface to retain the catalyst thereon. The carrier may vary in size, but preferably is from about 2½ mesh to about 10 mesh in the Tyler Standard screen size. Carrier particles smaller than 10 to 12 mesh normally cause an undesirable pressure drop in the reactor. Any of the other inert carriers of low surface, such as silicon carbides, alumina and silica gel may be employed.

The amount of the catalyst complex on the carrier may be varied from about 10 to about 30 weight percent, and more preferably from about 14 to about 24 weight percent on an inert carrier. These amounts of the catalyst complex are normally enough to substantially coat the surface of the carrier. With more absorbent carriers, larger amounts of material will be required to obtain complete coverage. In the case of silicon carbide, about 25 percent of catalyst is normally used. Excess catalyst over that required to coat the carrier surface will usually be lost by mechanical attrition. The final particle size of the catalyst particles which are coated on a carrier will also preferably be about 2½ to about 10 mesh size. The carriers may be of a variety of shapes, preferably cylinders or spheres.

Inert diluents such as silica may be present in the catalyst, but the combined weight of the vanadium, oxygen, phosphorus and catalyst activator should preferably constitute at least 50 weight percent of the composition which is coated on the carrier. Preferably these components constitute at least about 75 weight percent of the composition coated on the carrier, and more preferably at least about 95 weight percent.

Although more economical use of the catalyst on a carrier in fixed beds is obtained, the catalyst may be employed in fluid bed systems. Of course, the particle size of the catalyst used in fluidized beds is quite small, varying from about 10 to about 150 microns. In such systems the catalyst normally will not be provided with a carrier, but will be formed into the desired particle size after drying from solution.

The aforesaid comparison clearly shows the improved yield and productivity of maleic anhydride which can be obtained by practicing the invention. In the case of the air feed, the average number of pounds of maleic anhydride per pound of butane is less than 0.81, while the invention yields over 1.05 pounds per pound. Also, even at a 20° C. lower temperature, the moles of butane converted per pass per 100 moles of feed with the low $O_2$ feed mixtures are 10–20% greater than with air feed.

I claim:

1. In a process for the preparation of maleic anhydride wherein n-butane is oxidized in a reaction zone in the presence of a phosphorous--vanadium--oxygen complex catalyst containing one or more metal activators selected from the group consisting of zinc, copper, bismuth and lithium, the improvement which comprises: maintaining, in the reaction zone, the n-butane concentration above 1.7% of the feed, the oxygen concentration from 3–13% and the inert gas concentration from 70–95%; converting from 30 to 70% of the n-butane; withdrawing a reactor effluent from said reaction zone containing maleic anhydride, oxides of carbon and unreacted butane; separating the maleic anhydride; and recycling a major portion of the remaining reactor effluent to the reaction zone.

2. The process of claim 1 wherein the inert gas is nitrogen.

3. The process of claim 1 wherein a portion of said remaining reactor effluent is purged so as to maintain an equilibrium concentration of the oxides of carbon in the system.

4. The process of claim 1 wherein pure oxygen is introduced into the reaction system and admixed with an inert gas and the recycle stream.

5. The process of claim 1 wherein a combination of pure oxygen and atmospheric air are introduced into the reaction system and admixed with an inert gas and the recycle stream.

6. The process of claim 1 wherein the reaction pressure is from 15 to 100 p.s.i.a.

7. The process of claim 1 wherein the catalyst comprises about 0.5 to about 5 atoms of phosphorus for each atom of vanadium and is activated with from 0.05 to 0.35 atoms of an activator for each atom of vanadium.

8. The process of claim 7 wherein the activator is zinc.

9. The process of claim 7 wherein there is one to two atoms of phosphorus present for each atom of vanadium.

* * * * *